(12) United States Patent
Endo et al.

(10) Patent No.: US 6,637,530 B1
(45) Date of Patent: Oct. 28, 2003

(54) HYBRID VEHICLE CONTROL APPARATUS WHEREIN BATTERY IS CHARGED BASED ON REQUIRED CHARGING AMOUNT AND/OR ENERGY CONVERSION EFFICIENCY OF ELECTRIC GENERATOR

(75) Inventors: Hiroatsu Endo, Susono (JP); Hidehiro Oba, Aichi-gun (JP); Kazumi Hoshiya, Gotenba (JP); Mitsuhiro Umeyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 41 days.

(21) Appl. No.: 09/684,468

(22) Filed: Oct. 6, 2000

(30) Foreign Application Priority Data

Oct. 8, 1999 (JP) .............................. 11-287934

(51) Int. Cl.[7] .............................................. B60K 31/02
(52) U.S. Cl. ...................... 180/65.2; 180/65.3; 180/65.4
(58) Field of Search ................................ 180/65.1, 65.2, 180/65.3, 65.4, 65.6, 65.7

(56) References Cited

U.S. PATENT DOCUMENTS

| | | | | |
|---|---|---|---|---|
| 5,115,183 A | * | 5/1992 | Kyoukane et al. | 320/61 |
| 5,244,054 A | * | 9/1993 | Parry | 180/165 |
| 5,755,303 A | * | 5/1998 | Yamamoto et al. | 180/65.2 |
| 5,846,155 A | * | 12/1998 | Taniguchi et al. | 477/2 |
| 5,941,328 A | * | 8/1999 | Lyons et al. | 180/65.1 |
| 6,044,922 A | * | 4/2000 | Field | 180/65.2 |
| 6,122,587 A | * | 9/2000 | Takahara et al. | 701/78 |
| 6,220,381 B1 | * | 4/2001 | Damron et al. | 180/65.3 |
| 6,232,744 B1 | * | 5/2001 | Kawai et al. | 320/132 |
| 6,232,748 B1 | * | 5/2001 | Kinoshita | 320/132 |
| 6,242,873 B1 | * | 6/2001 | Drozdz et al. | 318/139 |
| 6,244,368 B1 | * | 6/2001 | Ando et al. | 180/65.2 |
| 6,253,127 B1 | * | 6/2001 | Itoyama et al. | 701/22 |
| 6,278,915 B1 | * | 8/2001 | Deguchi et al. | 701/22 |
| 6,328,670 B1 | * | 12/2001 | Minowa et al. | 477/5 |
| 6,328,671 B1 | * | 12/2001 | Nakajima et al. | 477/46 |
| 6,333,612 B1 | * | 12/2001 | Suzuki et al. | 318/432 |
| 6,336,063 B1 | * | 1/2002 | Lennevi | 701/22 |
| 6,435,296 B1 | * | 8/2002 | Arai | 180/243 |
| 2001/0040060 A1 | * | 11/2001 | Morimoto et al. | 180/65.3 |
| 2001/0049571 A1 | * | 12/2001 | Shimizu et al. | 701/22 |

FOREIGN PATENT DOCUMENTS

| | | |
|---|---|---|
| JP | 937410 A | 2/1997 |
| JP | 974611 A | 3/1997 |
| JP | 998516 A | 4/1997 |

* cited by examiner

*Primary Examiner*—Brian L. Johnson
*Assistant Examiner*—J. Allen Shriver
(74) *Attorney, Agent, or Firm*—Kenyon & Kenyon

(57) ABSTRACT

A control apparatus for controlling a hybrid automotive vehicle including an engine and an electric motor as drive power sources for driving the vehicle, and an electric generator operable by the engine to charge a battery while the vehicle is driven by the engine. The control apparatus includes a charging opportunity selecting device operable to determine whether the battery should be charged by the electric generator, on the basis of at least one of a required charging amount of electric energy with which the battery is charged and an energy conversion efficiency of said electric generator.

11 Claims, 10 Drawing Sheets

FIG. 4

| SHIFT LEVER POSITION | MODE | ENGAGED(○) OR RELEASED(✕) | | |
|---|---|---|---|---|
| | | C1 | C2 | B1 |
| B,D | ETC MODE | ✕ | ○ | ✕ |
| | DIRECT MODE | ○ | ○ | ✕ |
| | MOTOR DRIVE MODE | ○ | ✕ | ✕ |
| N,P | NEUTRAL MODE 1,2 | ✕ | ✕ | ✕ |
| | CHARGING & ENGINE START MODE | ✕ | ✕ | ○ |
| R | MOTOR DRIVE MODE | ○ | ✕ | ✕ |
| | FRICTION DRIVE MODE | ○ | ✕ | ○ |

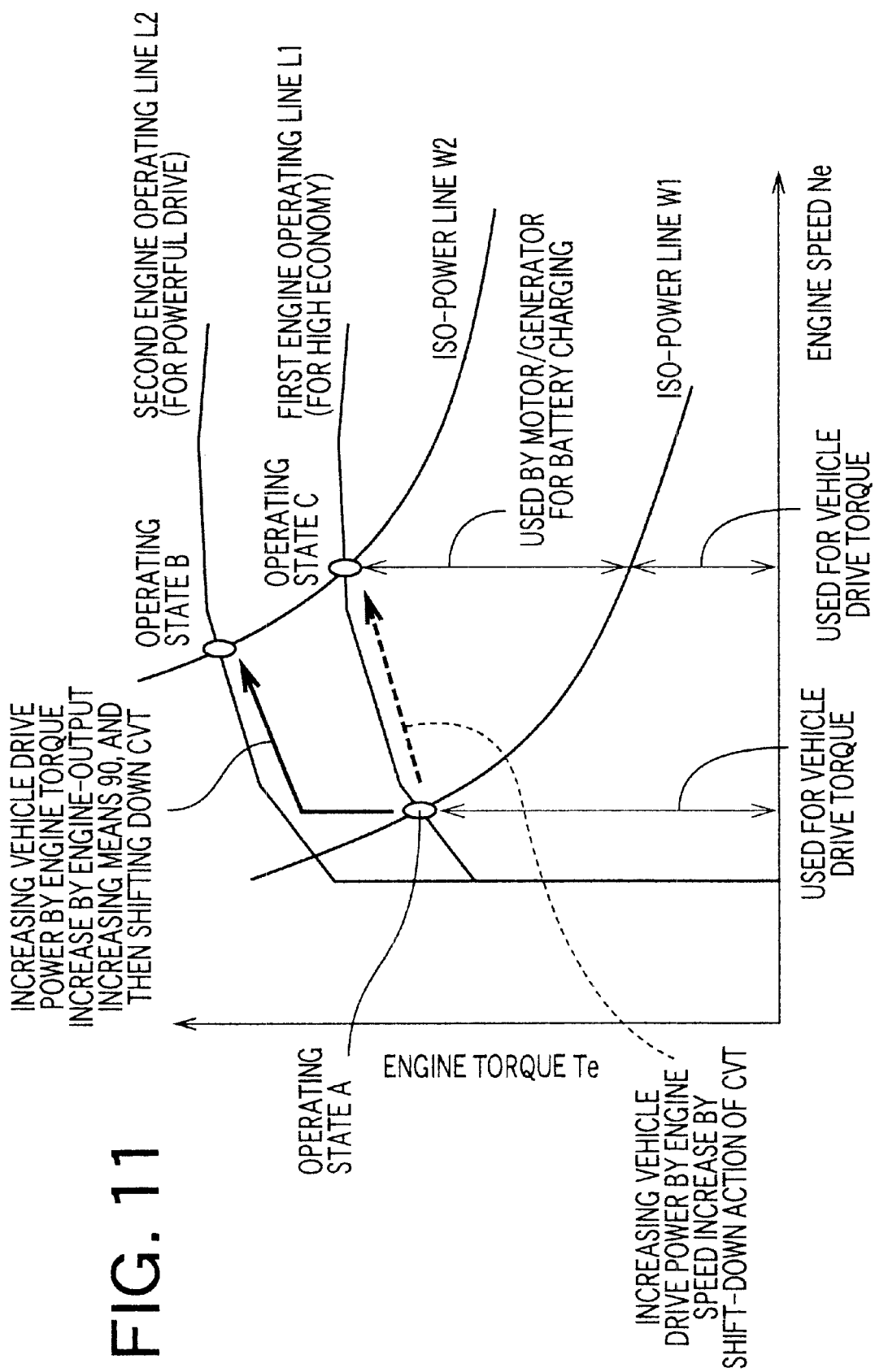

HYBRID VEHICLE CONTROL APPARATUS WHEREIN BATTERY IS CHARGED BASED ON REQUIRED CHARGING AMOUNT AND/ OR ENERGY CONVERSION EFFICIENCY OF ELECTRIC GENERATOR

The present invention relates to a hybrid automotive vehicle, and more particularly to techniques for charging a battery by operating an electric generator while the vehicle is driven by an engine operated as a drive power source.

BACKGROUND OF THE INVENTION

1. Field of the Invention

The present invention relates to a hybrid automotive vehicle, and more particularly to techniques for charting a battery by operating an electric generator while the vehicle is driven by an engine operated as a drive power source.

2. Discussion of Related Art

There is known a control apparatus for a hybrid automotive vehicle which includes, as drive power sources, an engine operable by combustion of a fuel and an electric motor. The control apparatus is adapted to charge a battery by operating an electric generator while the vehicle is driven by the engine operated as a drive power source. JP-A-9-98516 discloses an example of such a hybrid vehicle control apparatus, which is arranged to control an output of the engine so as to maximize the efficiency of charging of the battery in terms of the fuel economy, while taking into account of the energy conversion efficiency of the electric generator and the battery.

However, the above-indicated control apparatus arranged to control the output of the engine so as to maximize the efficiency of charging of the battery in terms of the fuel economy does not necessarily permit sufficiently high degrees of energy conversion efficiency and fuel economy, depending upon the vehicle drive force as desired by the vehicle operator and the amount by which the battery is charged. For instance, the amount of charging of the battery is determined by the amount of electric energy presently stored in the battery, and the electric generator is operated to generate the amount of electric energy corresponding to the determined amount of charging of the battery. In this case, the operating speed and drive torque of the electric generator decrease with a decrease in the amount of charging of the battery, so that the energy conversion efficiency decreases with a decrease in the amount of charging of the battery. On the other hand, the output of the engine is controlled so as to maximize the fuel economy. This arrangement may have a risk that the vehicle cannot be driven with a drive force which is as large as desired by the vehicle operator where the operator's desired vehicle drive force is relatively large. The term "amount of charging of the battery" is interpreted to mean an amount of electric energy with which the battery is charged per unit time, namely, electric power W and the term "amount of electric energy presently stored in the battery" is interpreted to mean an amount of electric power Wh or Ah.

SUMMARY OF THE INVENTION

It is therefore an object of the present invention to provide a hybrid vehicle control apparatus which provides a further improvement in the fuel economy of an engine and which permits a hybrid vehicle to be driven with a drive force as desired by the vehicle operator even when the operator's desired drive force is relatively large.

The above object may be achieved according to a first aspect of the present invention, which provides a control apparatus for controlling a hybrid automotive vehicle including an engine operable by combustion of a fuel and an electric motor as drive power sources for driving the vehicle, and an electric generator operable by the engine to generate an electric energy for charging a battery while the vehicle is driven by the engine, the control apparatus comprising a charging opportunity selecting device operable to determine whether the battery should be charged by the electric generator, on the basis of at least one of a required charging amount of electric energy with which the battery is charged and an energy conversion efficiency of the electric generator.

In the hybrid vehicle control apparatus constructed according to the first aspect of this invention, the charging opportunity selecting device is arranged to make a determination as to whether the battery should be charged by operation of the electric generator, on the basis of at least one of the required charging amount of the battery and the energy conversion efficiency of the electric generator. According to this arrangement, the battery is charged only when the energy conversion efficiency of the electric generator is relatively high, so that the fuel economy of the engine is accordingly improved. Further, the battery is charged when the speed of the engine is comparatively high, so that the charging does not take place when the accelerator pedal is released. If the battery charging took place upon releasing of the accelerator pedal, the engine speed Ne would be undesirably raised. Thus, the present arrangement prevents a rise of the engine speed due to the battery charging. Such rise and change of the engine speed upon charging of the battery is unexpected by the vehicle operator.

The required charging amount of the battery indicated above corresponds to an electric power generated by the electric generator, that is, the operating speed of the electric generator multiplied by the regenerative torque of the electric generator. Therefore, the energy conversion efficiency of the electric generator can be improved by permitting the charging of the battery only when the required charging amount of the battery is larger than a predetermined lower limit.

The control apparatus according to the first aspect of the invention is applicable to various hybrid automotive vehicles having a synthesizing/distributing device of a gear type such as a parallel or series type or a planetary gear type. The electric motor and the electric generator may be mutually separate units, or a single motor/generator unit which selectively functions as the electric motor or the electric generator. The present control apparatus is also applicable to a hybrid vehicle having a plurality of motor/generator units.

In one preferred form of the first aspect of the invention, the control apparatus further comprises means for determining the required charging amount of electric energy of the battery on the basis of an amount of electric energy presently stored in the battery. In this case, the electric generator is operated to charge the battery with the required charging amount. However, the electric generator may be operated to generate an electric energy so as to satisfy any other requirement relating to the charging of the battery. The electric generator may be mechanically connected to and driven by the engine. Alternatively, the electric generator may be driven by a rotary motion of the vehicle wheels transmitted thereto.

In a further preferred form of the control apparatus according to the first aspect of the invention, the charging opportunity selecting device determines whether the battery should be charged, on the basis of the energy conversion efficiency of the electric motor. In this case, the energy conversion efficiency of the electric motor need not be directly obtained. For instance, a permissible operating range (e.g., permissible operating speed and torque) of the electric generator within which the battery can be charged with a high energy conversion efficiency is determined, and the determination as to whether the battery should be charged is effected by determining whether the operating state of the electric generator is held within the permissible operating range.

In an alternative preferred form of the control apparatus, the charging opportunity selecting device determines whether the battery should be charged, on the basis of the required charging amount of the battery. Namely, the operating state of the electric generator is almost determined by the required charging amount of the battery as well as the vehicle-operator's desired vehicle drive power. In this respect, the determination may be effected by determining whether a sum of the required charging amount of the battery and the operator's desired vehicle drive power, which is the required total vehicle drive power, is larger than a predetermined threshold which is determined with the energy conversion efficiency of the electric motor being taken into account.

Other parameters such as the vehicle running speed, the operating amount of the accelerator pedal and the operating state of the brake pedal may be used to determine whether the battery should be charged or whether the charging of the battery should be permitted or inhibited.

When the vehicle operator requires the vehicle to be decelerated (for example, when the accelerator pedal is released or the brake pedal is operated) while the battery is charged by the electric generator, it is desirable to inhibit or interrupt the charging of the battery and turn off the engine. In this instance, the electric generator is operated by a kinetic energy of the vehicle, so as to generate an electric energy for charging the battery and a regenerative brake to be applied to the vehicle.

The control apparatus according to the first aspect of the invention is suitably applicable to the hybrid automotive vehicle which includes (a) a motor/generator which selectively functions as the electric motor and the electric generator, (b) an output member operatively connected to a drive wheel of the vehicle for driving the vehicle, (c) a synthesizing/distributing device of gear type connected to the engine, the motor/generator and the output member, for synthesizing and distributing forces among the engine, the motor/generator and the output member, and (d) a continuously variable transmission disposed between the output member and the drive wheel.

In the hybrid vehicle described above, the synthesizing/distributing device may include a housing, a first rotary element connected to the engine, a second rotary element connected to the motor/generator and connected to the output member through a first clutch, and a third rotary element connected to the output member through a second clutch and fixed to the housing through a brake.

The object indicated above may also be achieved according to the second aspect of this invention, which provides a control apparatus for controlling a hybrid automotive vehicle including an engine operable by combustion of a fuel and an electric motor as drive power sources for driving the vehicle, a continuously variable transmission through which at least a drive force generated by the engine is transmitted to drive the wheels of the vehicle, and an electric generator operable by the engine to generate an electric energy for charging a battery while the vehicle is driven by the engine, the control apparatus comprising: (a) a first engine/transmission control device operable upon charging of the battery, to increase a torque of the engine while shifting down the continuously variable transmission so as to increase an operating speed of the engine; and (b) a second engine/transmission control device operable upon an increase in a vehicle-operator's desired drive power for driving the vehicle, to increase the torque of the engine and shifting down the transmission so as to increase the operating speed of the engine, the second engine/transmission control device including engine-output increasing means for increasing the torque of the engine, the engine having a throttle valve, and the engine-output increasing means having a response higher than the throttle valve.

In the hybrid vehicle control apparatus constructed according to the second aspect of this invention, the continuously variable transmission is shifted down when the battery is charged so that the output of the engine is increased, for example, along a first engine operating line which is formulated for improved fuel economy of the engine, as described below. Accordingly, the battery can be charged with a high degree of fuel consumption efficiency or fuel economy, without reducing the vehicle drive force. When the vehicle-operator's desired vehicle drive power is increased, on the other hand, the torque of the engine is increased by the engine-output increasing means, and the continuously variable transmission is shifted down so that the operating speed of the engine is increased, for example, along a second engine operating line which represents a higher torque of the engine than the first engine operating line, as described below. Accordingly, the vehicle drive torque can be rapidly increased to a value large enough to drive the vehicle with high drivability.

The engine-output increasing means of the second engine/transmission control device, which has a higher response than the throttle valve, may include a variable valve timing mechanism (VVT), a D4 xlean-burn control device, an engine-power increasing device, a turbocharger or other suitable engine-power increasing device. If necessary, the electric motor may be operated to provide an assisting torque to be added to the engine torque, for assisting the engine to drive the vehicle, so that the acceleration response of the vehicle can be improved.

In one preferred form of the control apparatus according to the second aspect of the invention, the first engine/transmission control device controls the engine such that the operating state of the engine changes along a first engine operating line which is formulated for improved fuel economy of the engine, and the second engine/transmission control device controls the engine such that the operating state of the engine changes along a second engine operating line which is formulated to provide a larger torque than the first engine operating line, the first and second engine operating lines being defined by the torque and speed of the engine.

The second engine operating line indicated above may be a predetermined single line, or a selected one of a plurality of operating lines which is selected according to the vehicle-operator's desired vehicle drive power or other parameter.

In another preferred form of the control apparatus according to the second aspect of this invention, the first engine/transmission control device shifts down the continuously variable transmission at a speed which is lower than that at which the continuously variable transmission is shifted down while the battery is not charged.

In the above form of the invention, the speed at which the continuously variable transmission is shifted down under the control of the second engine/transmission control device is lower than the speed at which the transmission is shifted down while the battery is not charged. This arrangement is effective to reduce an amount of variation in the vehicle drive force due to an inertia of the engine when the engine speed is increased as a result of a shift-down action of the transmission. Accordingly, the operating state of the engine can be changed following the first engine operating line indicated above, with high accuracy, so that the fuel economy of the engine can be further improved.

The shift-down speed of the continuously variable transmission can be reduced by smoothing the desired value of its input shaft speed, or by gradually changing the charging amount of the battery at a rate lower than a predetermined upper limit.

The control apparatus according to the second aspect of the invention is suitably applicable to the hybrid vehicle which includes (a) a motor/generator which selectively functions as the electric motor and the electric generator, (b) an output member operatively connected through the continuously variable transmission to a drive wheel of the vehicle for driving the vehicle, and (c) a synthesizing/distributing device of gear type connected to the engine, the motor/generator and the output member, for synthesizing and distributing forces among the engine, the motor/generator and the output member.

In the hybrid vehicle described above, the synthesizing/distributing device may include a housing, a first rotary element connected to the engine, a second rotary element connected to the motor/generator and connected to the output member through a first clutch, and a third rotary element connected to the output member through a second clutch and fixed to the housing through a brake.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIG. 4 is a view showing various vehicle operating modes selectively established by a hybrid control device shown in FIG. 1, and a relationship between the operating modes and respective combinations of operating states of two clutches and a brake;

Figure 7:
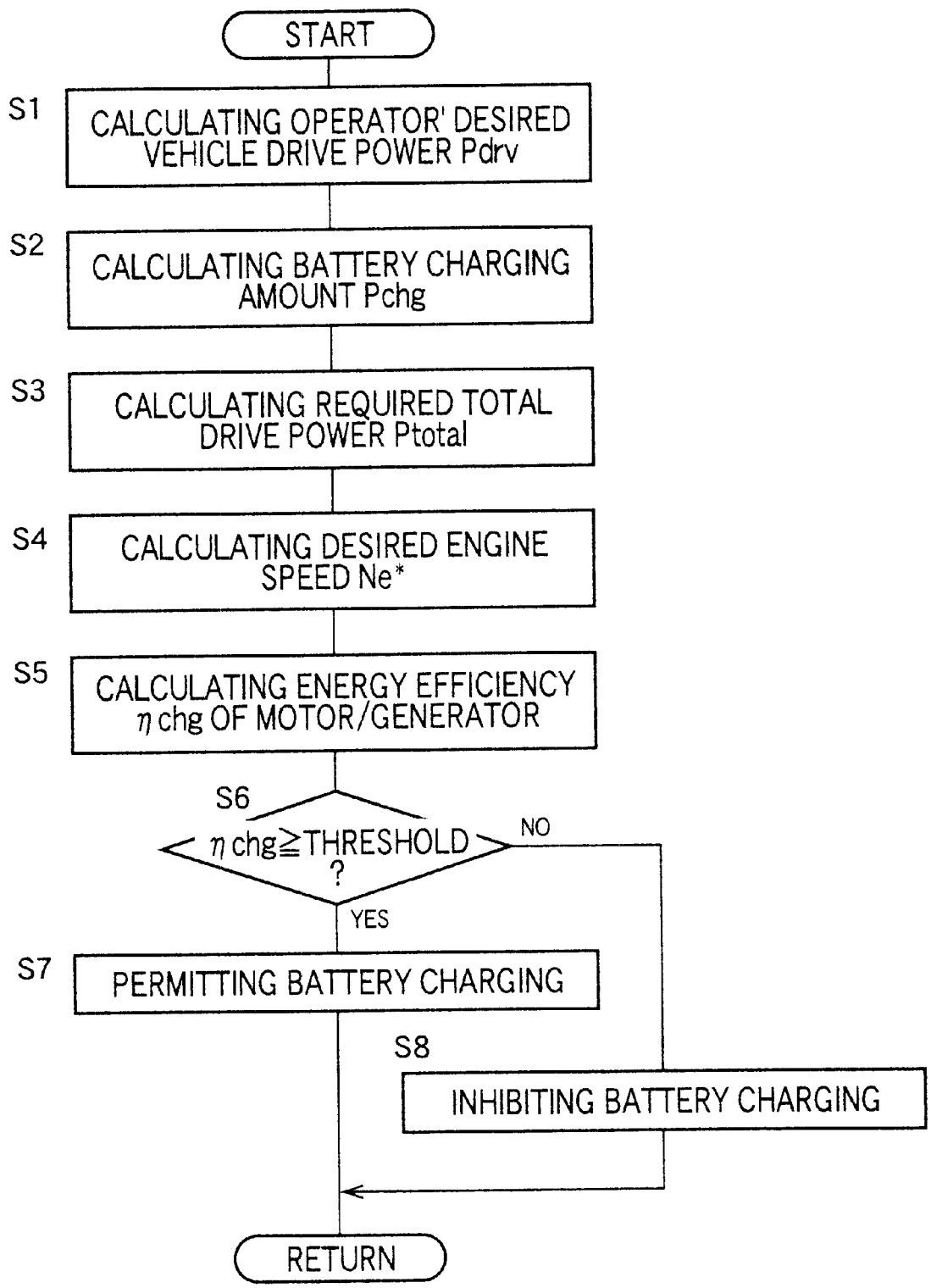
FIG. 7 is a flow chart illustrating a control routine according to the first embodiment of the invention, for determining whether a motor/generator is operated as an electric generator so as to generate an electric energy for charging a battery in the DIRECT mode.
Figure 10:
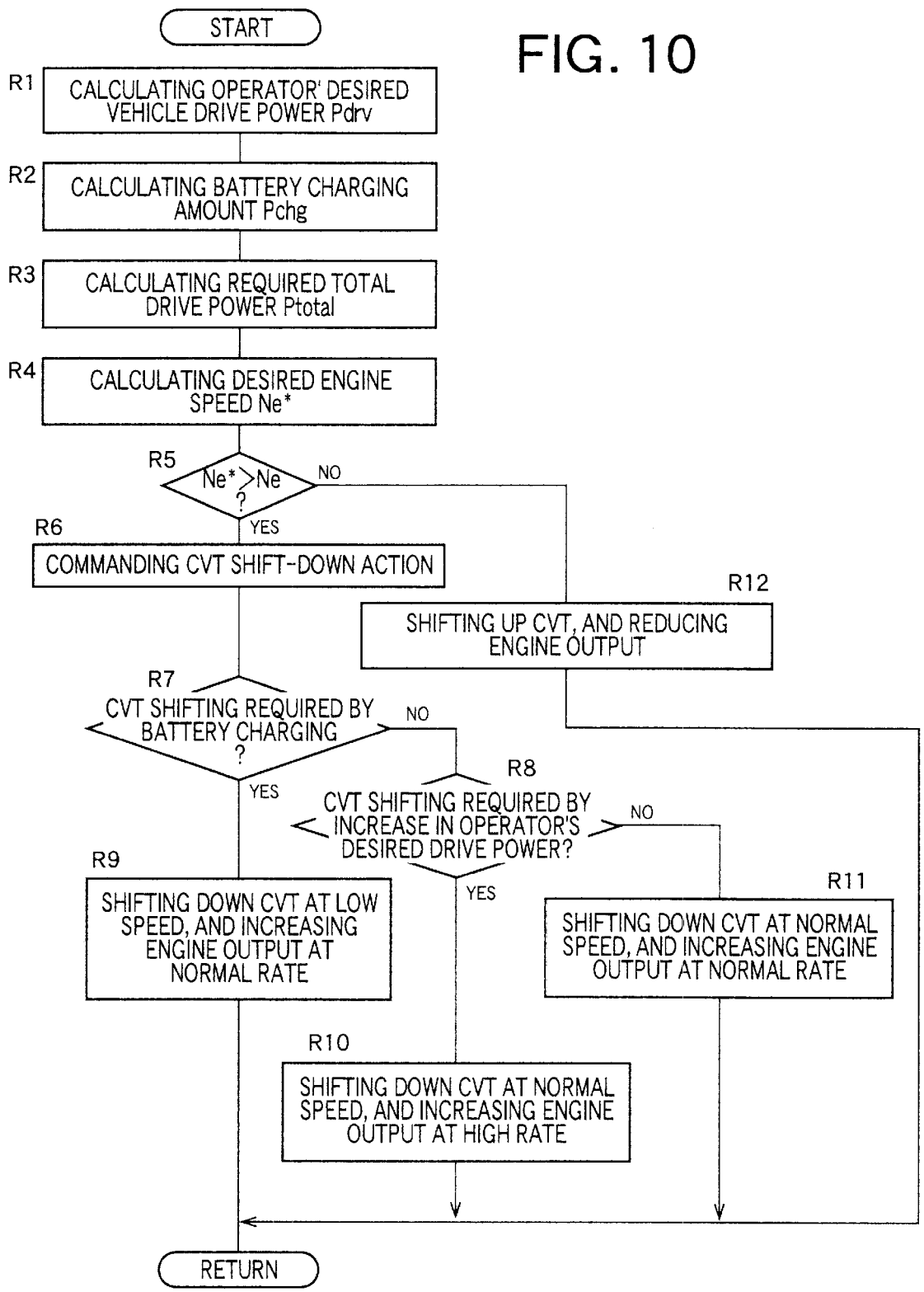

FIG. 10 is a flow chart illustrating a control routine according to a second embodiment of the invention, for controlling a shifting action of a transmission and an output of an engine, in the DIRECT mode, depending upon a requirement for battery charging, and the operator's desired vehicle drive power; and FIG. 11 is a graph showing a change in the operating state of the engine when the shifting action of the transmission and the output of the engine are controlled according to the control routines of the flow charts of FIGS. 7 and 10.

DETAILED DESCRIPTION OF THE PREFERRED EMBODIMENTS

Figure 1:
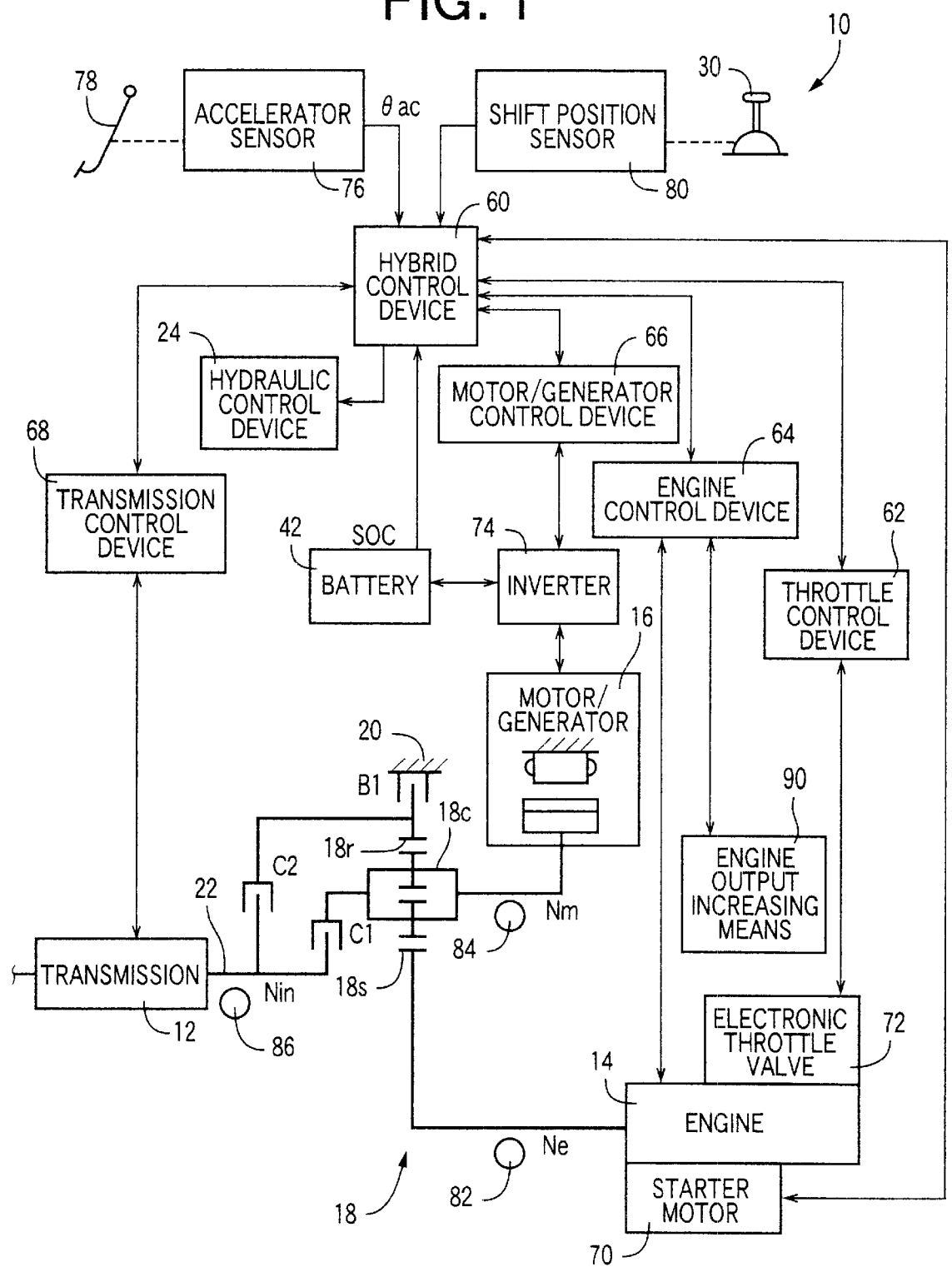
FIG. 1 is a schematic view showing an arrangement of a hybrid drive system of a hybrid automotive vehicle, which drive system includes a control apparatus constructed according to one embodiment of this invention.
Figure 2:
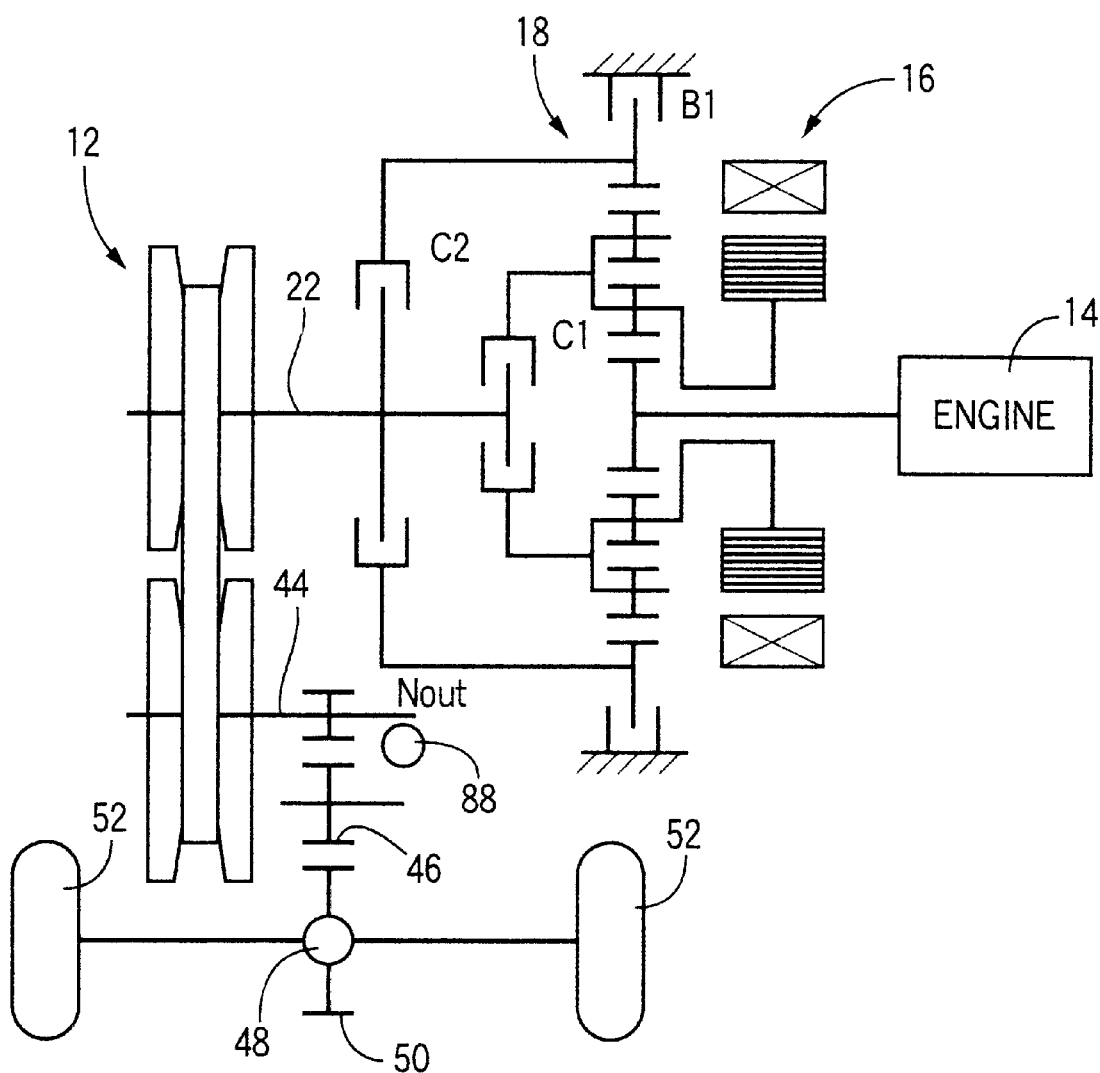
FIG. 2 is a schematic view showing a power transmitting system of the hybrid drive system of FIG. 1.

Referring first to FIGS. 1 and 2, there is schematically shown an arrangement of a hybrid drive system 10 of a hybrid automotive vehicle, which is constructed according to one embodiment of the present invention. As shown in FIG. 2, the hybrid drive system 10 includes an engine 14, a motor/generator 16, and a power transmitting system which includes a transmission 12 and a planetary gear device 18 of a double-pinion type. The engine 14 is operated by combustion of a fuel to produce a drive force, and the motor/generator 16 serves as an electric motor and an electric generator.

The planetary gear device 18 includes a sun gear 18s connected to the engine 14, a carrier 18c connected to the motor/generator 16, and a ring gear 18r connected to a housing 20 through a first brake B1. The carrier 18c is further connected through a first clutch C1 to an input shaft 22 of the transmission 12, and the ring gear 18r is further connected through a second clutch C2 to the input shaft 22. It will be understood that the planetary gear device 18 functions as a synthesizing/distributing device of a gear type, and that the sun gear 18s, carrier 18c and ring gear 18r serve as a first, a second and a third rotary element of the planetary gear device 18, respectively. It will also be understood that the input shaft 22 of the transmission 12 serves as an output member operatively connected to drive wheels 52, 52.

Figure 3:
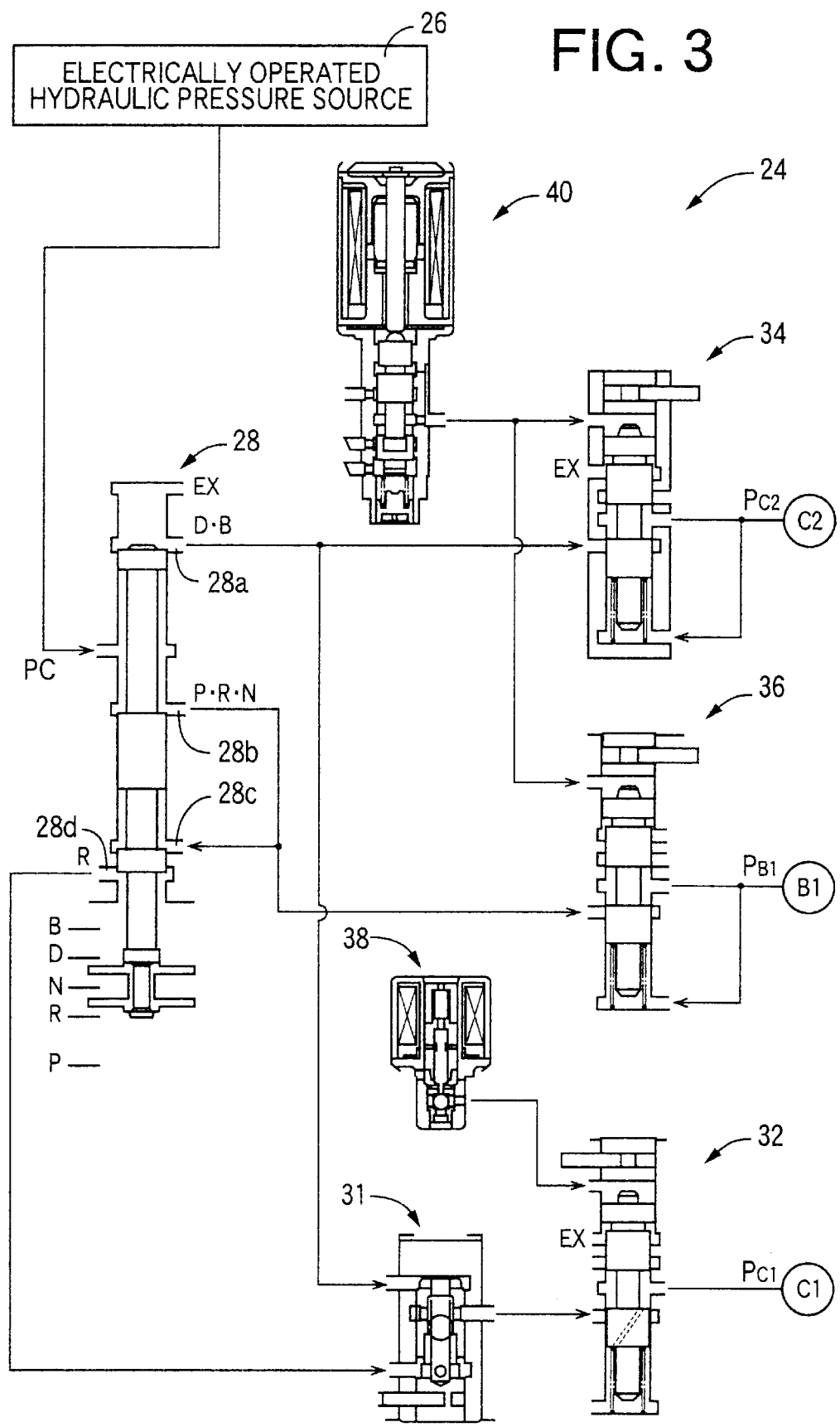
FIG. 3 is a view showing a portion of a hydraulic control device shown in FIG. 1.

Each of the first and second clutches C1, C2 and the brake B1 is a hydraulically operated frictional coupling device of a wet multiple-disc type which is frictionally engaged by a hydraulic actuator activated by a pressurized fluid supplied from a hydraulic control device 24. As shown in FIG. 3, the hydraulic control device 24 includes an electrically operated hydraulic pressure source 26 having an electrically operated pump, which generates a pressurized fluid having a line pressure PC. This line pressure PC is applied to the clutches C1, C2 and brake B1 through a manual valve 28, depending upon a presently selected position of a shift lever 30 (shown in FIG. 1). The shift lever 30, which is operated by an operator of the vehicle, has five operating positions B (BRAKE), D (DRIVE), N (NEUTRAL), R (REVERSE) and P (PARKING). The manual valve 28 is mechanically connected to the shift lever 30 through a cable or other linkage, so that the manual valve 28 is mechanically operated by the shift lever 30.

The operating position B is a power-source braking position which is usually selected to shift down the transmission 12 during a forward running of the vehicle, for applying a comparatively large power-source brake (e.g., an engine brake) to the vehicle. The operating position D is a forward-driving position selected to drive the vehicle in the forward direction. In these operating positions B and D, the line pressure PC is applied from an output port 28a of the manual valve 28 to the clutches C1, C2. The line pressure PC is applied to the first clutch C1 through a shuttle valve 31. The operating position N is a neutral position in which a power transmitting path between a drive power source in the form of the engine 14 and motor/generator 16 and the drive wheels 52 is disconnected. The operating position R is a reverse-driving position selected to drive the vehicle in the reverse direction. The operating position P is a parking position in which the power transmitting path indicated above is disconnected and in which a parking brake is mechanically applied to the drive wheels 52 by a parking lock device. In these operating positions N, R and P, the line pressure PC is applied from an output port 28b of the manual valve 28 to the brake B1. The line pressure PC is also applied from the output port 28b to a return port 28c. In the operating position R, the line pressure PC is applied from the return port 28c to the first clutch C1 through an output port 28d and the shuttle valve 31.

The clutches C1, C2 and brake B1 are provided with respective control valves 32, 34, 36, which control fluid pressures $P_{C1}$, $PC_{C2}$ and $P_{B1}$ applied to the clutches Cl, C2 and brake B1, respectively. The control valve 32 for the first clutch Cl is arranged to receive a pilot pressure from an ON-OFF valve 38, to regulate the pressure $P_{C1}$, while the control valves 34, 36 for the second clutch C2 and brake B1 are arranged to receive a pilot pressure from a linear solenoid valve 40, to regulate the pressures $P_{C2}$ and $P_{B1}$.

Referring next to FIG. 4, there are indicated various operating modes of the hybrid vehicle in relation to respective different combinations of operating states of the first and second clutches C1, C2 and the brake B1. In FIG. 4, "∘" represents the engaged state of the clutches and brake C1, C2, B1, while "X" represents the released state of the same. When the shift lever 30 is placed in the operating position B or D, one of an ETC mode (electric torque converter mode), a DIRECT mode and a FORWARD MOTOR DRIVE mode is established. The ETC mode is established by engaging the second clutch C2 and releasing the first clutch C1 and the brake B1. In the ETC mode, the vehicle is driven in the forward direction by operations of both of the engine 14 and the motor/generator 16. The DIRECT mode is established by engaging the first and second clutches C1, C2 and releasing the brake B1. In the DIRECT mode, the vehicle is driven in the forward direction by an operation of the engine 14.

The FORWARD MOTOR DRIVE mode is established by engaging the first clutch C1 and releasing the second clutch C2 and the brake B1. In the FORWARD MOTOR DRIVE mode, the vehicle is driven in the forward direction by an operation of the motor/generator 16 as a drive power source. The ETC mode (electric torque converter mode) may be referred to as an "engine & motor drive mode", while the DIRECT mode may be referred to as a "direct engine drive mode".

Figure 5A:
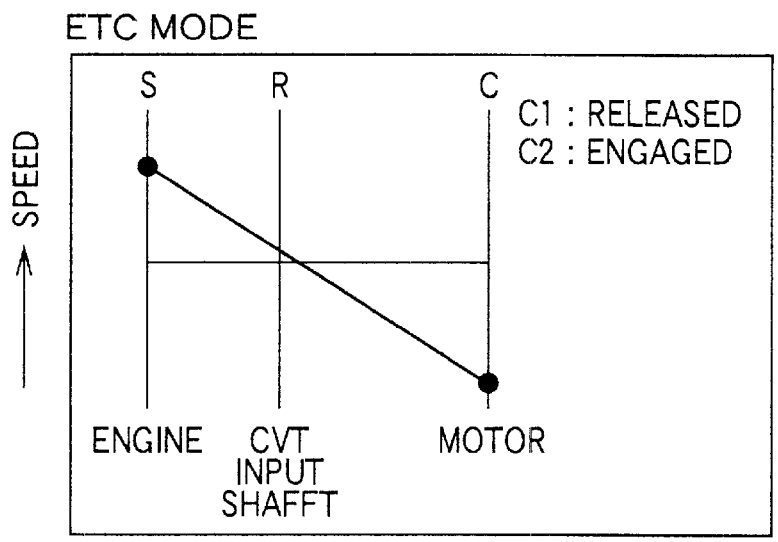
FIG. 5A is a collinear chart indicating a relationship of rotating speeds of rotary elements of the planetary gear device when the ETC mode of FIG. 4 is established.
Figure 5B:
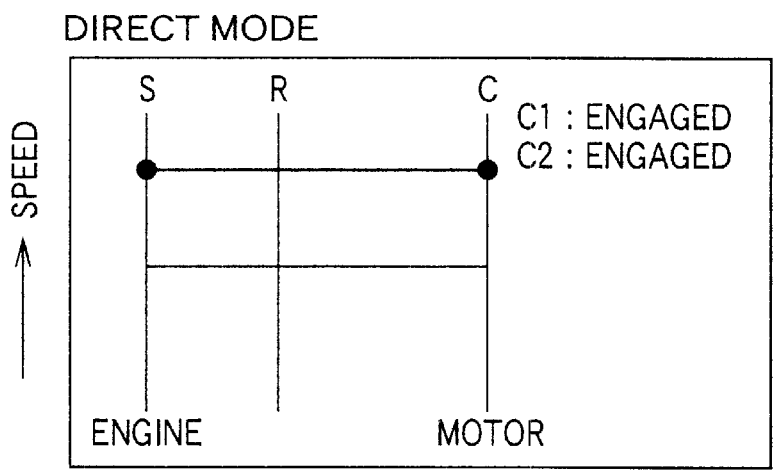
FIG. 5B is a collinear chart indicating a relationship of the rotating speeds of the rotary elements of the planetary gear device when the DIRECT mode of FIG. 4 is established.
Figure 5C:
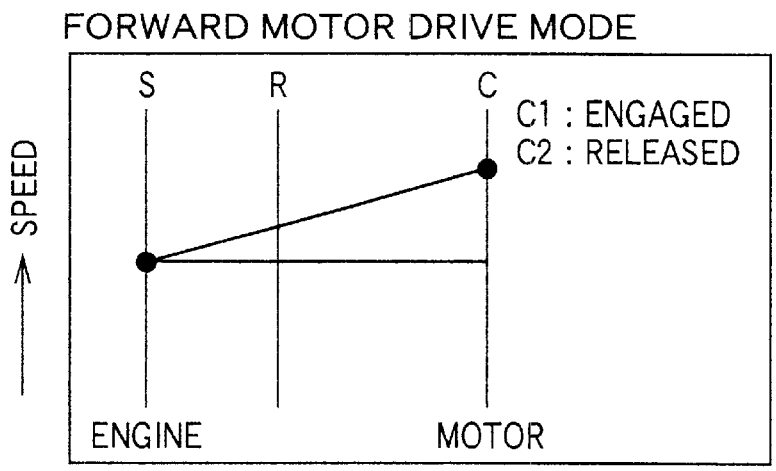
FIG. 5C is a collinear chart indicating a relationship of the rotating speeds of the rotary elements of the planetary gear device when the FORWARD MOTOR DRIVE mode of FIG. 4 is established.

Referring to the collinear charts of FIGS. 5A, 5B and 5C, the rotating speeds of the sun gear 18s, ring gear 18r and carrier 18c of the planetary gear device 18 are taken along vertical axes S, R and C, respectively. The distances between the axes S and R and between the axes R and C are determined by a speed ratio ρ of the planetary gear device 18, which is equal to the number of teeth of the sun gear 18s divided by the number of teeth of the ring gear 18r. Suppose the distance between the axes S and C is equal to "1", the distance between the axes R and C is equal to ρ. In the present embodiment, the speed ratio ρ is about 0.6. In the ETC mode of FIG. 5A, there exists the following relationship among a torque value Te of the engine 14, a torque value Tin of the input shaft 22 of the transmission 12, and a torque value Tm of the motor/generator 16:

$Te:Tin:Tm = \rho : 1 : 1-\rho$.

The required motor torque Tm is smaller than the engine torque Te, and the input shaft torque Tin of the transmission 12 is equal to a sum of the motor torque Tm and the engine torque Te. In the present embodiment, the transmission 12 is a continuously variable transmission (CVT) of a belt-and-pulley type.

Referring back to FIG. 4, a NEUTRAL mode or a CHARGING & ENGINE-STARTING mode is established when the shift lever 30 is placed in the operating position N or P. The NEUTRAL mode is established by releasing all of the first and second clutches C1, C2 and the brake B1. The CHARGING & ENGINE-STARTING mode is established by releasing the first and second clutches C1, C2 and engaging the brake B1. In the CHARGING & ENGINE-STARTING mode, the motor/generator 16 is operated in the reverse direction to start the engine 14, or the engine 14 is operated to drive the motor/generator 16 through the planetary gear device 18 to generate an electric energy for charging a battery 42 (FIG. 1) while the motor/generator 16 is controlled as an electric generator for controlling the amount of electric energy to be generated.

When the shift lever 30 is placed in the operating position R, a REVERSE MOTOR DRIVE mode or a FRICTION DRIVE mode is established. The REVERSE MOTOR DRIVE mode is established by engaging the first clutch C1 and releasing the second clutch C2 and the brake B1. In the REVERSE MOTOR DRIVE mode, the vehicle is driven in the reverse direction by an operation of the motor/generator 16 in the reverse direction so as to rotate the carrier 18c and the input shaft 22 in the reverse direction. The FRICTION DRIVE mode is established when an operation of the engine 14 to assist the motor/generator 16 is required during a running of the vehicle in the REVERSE MOTOR DRIVE mode. The FRICTION DRIVE mode is established by starting the engine 14, engaging the first clutch C1, releasing the second clutch C2, and partially engaging the brake B1 (effecting a slipping engagement of the brake B1) while the sun gear 18s is rotated by the engine 14 in the forward direction so that the ring gear 18r is rotated by the sun gear 18s in the forward direction. With the slipping engagement of the brake B1, the rotation of the ring gear 18r is limited or restricted so that a torque is applied to the carrier 18c in the reverse direction, whereby an assisting drive torque is applied to the input shaft 22 to increase the total drive torque for driving the vehicle in the reverse direction.

The transmission 12, which is a continuously variable transmission as described above, has an output shaft 44 which is operatively connected to the right and left drive wheels 52 through a counter gear 46 and ring gear 50 of a differential gear device 48, such that the drive force is distributed by the differential gear device 48 to the drive wheels 52.

The hybrid drive system 10 is controlled by a hybrid control device 60 shown in FIG. 1. The hybrid control device 60 incorporates a central processing unit (CPU), a random-access memory (RAM) and a read-only memory (ROM). The hybrid control device 60 executes signal processing operations according to control programs stored in the ROM while utilizing a temporary data storage function, to control a throttle control device 62, an engine control device 64, a motor/generator control device 66, a transmission control device 68, the ON-OFF valve 38 and linear solenoid valve 40 of the hydraulic control device 24, and a starter motor 70 for the engine 14. The throttle control device 62 is adapted to control the opening of an electronic throttle valve 72 of the engine 14. The engine control device 64 is adapted to control the output of the engine 14 by controlling the amount of fuel injection into the engine 14, a variable-valve-timing mechanism, and the ignition timing. The motor/generator control device 66 is adapted to control an inverter 74 for controlling the drive torque and the amount of electric energy generated by the motor/generator 16. The transmission control device 68 is adapted to control a speed ratio γ and the belt tension of the transmission 12. The speed ratio γ is equal to the input shaft speed Nin divided by the output shaft speed Nout. The engine control device 64 is further adapted to more rapidly increase the output of the engine 14, by controlling engine-output increasing means 90, than by controlling the electronic throttle valve 72. The engine-output increasing means 90 includes a variable valve timing mechanism (VVT), a D4 lean-burn control device, an engine-power increasing device, a turbocharger or other suitable engine-power increasing device. The hydraulic control device 24 is equipped with hydraulic control circuits for controlling the speed ratio γ and belt tension of the transmission 12. The starter motor 70 has a pinion which meshes with a ring gear of a flywheel of the engine 14, for cranking the engine 14 to start the engine 14.

The hybrid control device 60 receives output signals of an accelerator sensor 76, a shift position sensor 80, an engine speed sensor 82, a motor speed sensor 84, an input shaft speed sensor 86 and an output shaft speed sensor 88. The output signal of the accelerator sensor 76 represents an operating amount θac of an accelerator operating member in the form of an accelerator pedal 78. The output signal of the shift position sensor 80 represents the presently selected operating position of the shift lever 30. The output signals of the engine speed sensor 82, motor speed sensor 84, input shaft speed sensor 86 and output shaft speed sensor 88 represent the rotating speed Ne of the engine 14, the rotating speed Nm of the motor/generator 16, the rotating speed Nin of the input shaft 22 and the rotating speed Nout of the output shaft 44, respectively. The vehicle running speed V can be obtained from the rotating speed Nout of the output shaft 44. The hybrid control device 60 further receives other signals indicative of the operating condition of the vehicle, such as a signal indicative of the amount of electric energy SOC stored in the battery 42. The electric energy amount SOC may be simply represented by a voltage of the battery 42, or may be obtained on the basis of the detected cumulative charging and discharging amounts of the battery 42. The battery 42 functions as a device for storing an electric energy.

Figure 6:
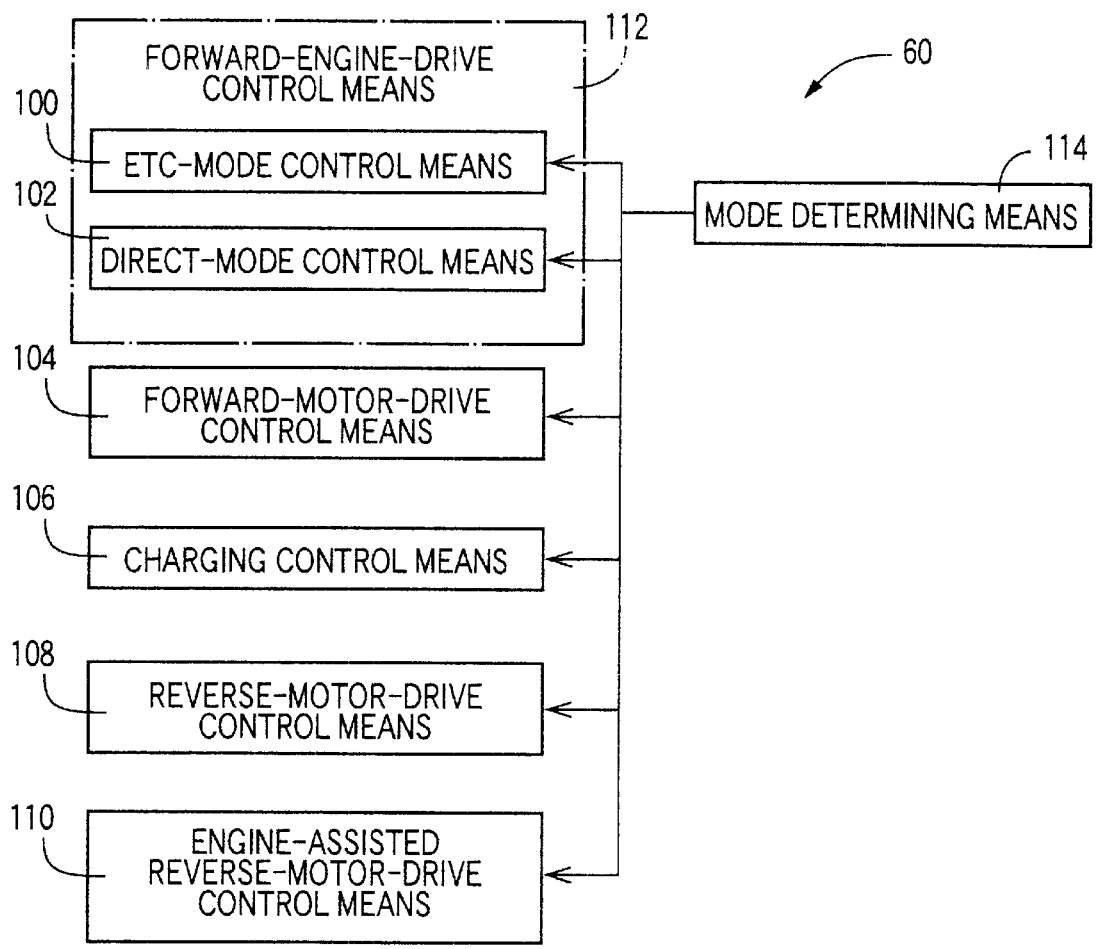
FIG. 6 is a block diagram illustrating various functional means of the hybrid control device.

The hybrid control device 60 has major functional means as illustrated in the block diagram of FIG. 6, which are arranged to selectively establish the operating modes of the vehicle indicated in FIG. 4. Namely, the hybrid control device 60 includes ETC-mode control means 100, DIRECT-MODE control means 102, FORWARD-MOTOR-DRIVE control means 104, CHARGING control means 106, REVERSE-MOTOR-DRIVE control means 108, and ENGINE-ASSISTED REVERSE-MOTOR-DRIVE control means 110. The ETC-mode control means 100 is arranged to establish the ETC mode, and the DIRECT-MODE control means 102 is arranged to establish the DIRECT mode. The FORWARD-MOTOR-DRIVE control means 104 is arranged to establish the FORWARD MOTOR DRIVE mode, and the CHARGING control means 106 is arranged to establish the CHARGING & ENGINE-STARTING mode. The REVERSE-MOTOR-DRIVE control means 108 is arranged to establish the REVERSE MOTOR DRIVE mode, and the ENGINE-ASSISTED REVERSE-MOTOR-DRIVE control means 110 is arranged to establish the FRICTION DRIVE mode. The ETC-MODE control means 100 and the DIRECT-MODE control means 102 cooperate to constitute FORWARD-ENGINE-DRIVE control means 112. The hybrid control device 60 further includes mode determining means 114 for selecting one of the above-indicated operating modes of the vehicle, on the basis of the operating amount θac of the accelerator pedal 78, the vehicle running speed V (speed Nout of the output shaft 44), the stored electric energy amount SOC, the presently selected operating position of the shift lever 30, and other parameters of the vehicle. The mode determining means 114 activates one of the above-indicated means 100, 102, 104, 106, 108 and 110, which corresponds to the selected operating mode.

In the DIRECT mode established by the DIRECT-MODE control means 102, the motor/generator 16 is operated as an electric generator to charge the battery 42 when the electric energy amount SOC stored in the battery 42 is reduced below a predetermined lower limit. It will be understood that the DIRECT-MODE control means 102 of the hybrid control device 60 constitutes a major portion of a control apparatus for controlling the hybrid automotive vehicle during running of the vehicle with the engine 14, so as to charge the battery 42. The flow chart of FIG. 7 illustrates a control routine executed to determine whether the battery 42 should be charged. This control routine is executed by the DIRECT-MODE control means 102 with a predetermined cycle time.

Figure 8:
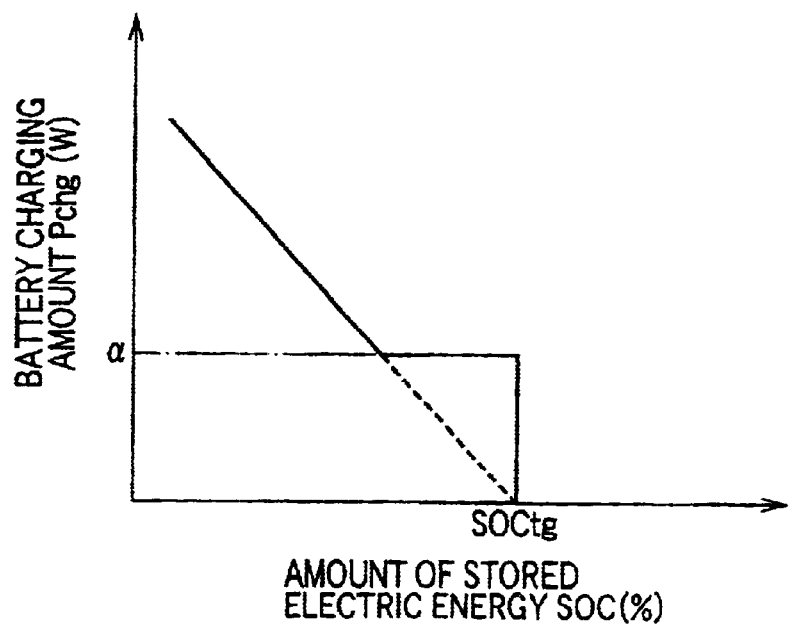
FIG. 8 is a graph indicative of a data map used in step S2 of the control routine of FIG. 7 to determine the amount of charging Pchg of the battery.

The control routine of FIG. 7 is initiated with step S I in which a vehicle drive power Pdrv desired by the vehicle operator is calculated on the basis of a suitable parameter such as the operating amount θac of the accelerator pedal 78 or the running speed V of the vehicle, a rate of change of the operating amount θac, and according to a predetermined relationship between the operator's desired vehicle drive power Pdrv and the selected parameter. This relationship is represented by a predetermined equation or data map stored in the ROM of the hybrid control device 60. Then, the control flow goes to step 82 calculates a required charging amount of electric energy Pchg with which the battery 42 is to be charged. The calculation of this required charging amount Pchg of the battery 42 is effected on the basis of the electric energy amount SOC currently stored in the battery 42, and according to predetermined relationship between the required charging amount Pchg and the stored electric energy amount SOC. This relationship is also represented by a predetermined equation or data map stored in the ROM. An example of the data map to calculate the charging amount Pchg is indicated in the graph of FIG. 8. According to this data map, the charging amount Pchg is zero when the stored electric energy amount SOC is larger than a predetermined threshold SOCtg. In this case, the motor/generator 16 is not operated by the engine 14. When the stored electric energy amount SOC is not larger than the threshold SOCtg, the required charging amount Pchg of the battery 42 is determined depending upon the stored electric energy amount SOC. In the known control apparatus, the battery charging amount Pchg is linearly increased with a decrease in the stored electric energy amount SOC, as indicated by broken line in FIG. 8. In the present embodiment, the motor/generator 6 is operated so as to generate an electric power corresponding to the determined battery charging amount Pchg, so that the energy conversion efficiency ρchg of the motor/generator 16 is lowered when the required charging amount Pchg is relatively small. In view of this tendency of the energy conversion efficiency ηchg, the present embodiment is arranged to linearly increase the required charging amount Pchg with an decrease in the stored electric energy amount SOC only within a range of the charging amount larger than a predetermined lower limit α, as indicated by solid line in FIG. 8, namely only when the required charging amount Pchg is larger than the lower limit a, that is, only when the stored electric energy amount SOC is smaller than a value corresponding to the above-indicated lower limit α.

Then, the control flow goes to step S3 to calculate a required total vehicle drive power Ptotal by summing the calculated desired vehicle drive power Pdrv and the calculated required battery charging amount Pchg. Step S3 is followed by step S4 to calculate a desired speed Ne* of the engine 14 at which the calculated required total vehicle drive power Ptotal is obtained. For instance, the desired engine speed Ne* can be calculated according to a first engine operating line L1 indicated in FIG. 11, which is formulated to assure a comparatively high fuel economy of the engine 14. Described more specifically by reference to FIG. 11, in the case of a transition of the operating state of the engine 14 from a state A to a state C indicated in the figure, the desired drive power Pdrv before initiation of charging of the battery 42 is equal to W1 (which is equal to the required total vehicle drive power Ptotal). The operating state of the engine 14 is represented by the torque Te and speed Ne of he engine 14, as indicated in FIG. 11. Where the battery 42 is charged in this operating state A, the required total vehicle drive power Ptotal is equal to W2 which is equal to (Pdrv+Pchg), and the engine operating state is changed from the state A to the state C represented by a point of intersection between an iso-power line W2 and the first engine operating line L1. In this operating state C, the desired engine speed Ne* is represented by the above-indicated point of intersection representing the operating state C. The first engine operating line L1 represents the engine speed Ne at which the fuel economy is maximum on the iso-power lines W1, W2, etc. at different values of the engine torque Te. The first engine operating line L1 is represented a data map stored in the ROM of the hybrid control device 60.

Figure 9:
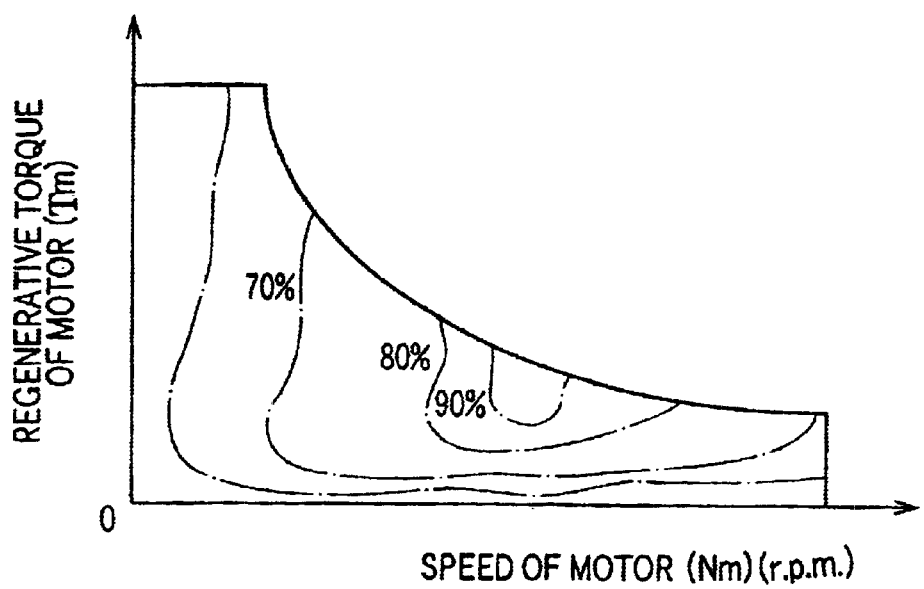
FIG. 9 is a graph indicative of a data map used in step S5 of the control routine of FIG. 7 to determine an energy efficiency η chg.

Then, the control flow goes to step S5 in which the energy conversion efficiency ηchg is calculated on the basis of the calculated desired engine speed Ne* and battery charging amount Pchg, and according to a stored energy conversion data map of the motor/generator 16, a shown in FIG. 9 by way of example. Described in detail, the operating state of the motor/generator 14 is represented by its operating speed Nm which is equal to the desired speed Ne* of the engine 16, and its regenerative torque Tm which is obtained by dividing the calculated battery charging amount Pchg by the motor speed Nm. On the basis of the speed m and torque Tm of the motor/generator 14 and according to the energy conversion data map of FIG. 9, the energy conversion efficiency ηchg is obtained.

Step S5 is followed by step S6 to determine whether the energy conversion efficiency 77 chg obtained in step S5 is equal to or higher than a predetermined threshold (which may be a fixed constant value). If an affirmative decision (YES) is obtained in step S6, the control flow goes to step S7 to permit the charging of the battery 42. As a result, the shifting action of the continuously variable transmission 12 of belt-and-pulley type and the output of the engine 14 are controlled such that the operating state of the engine 14 is shifted from the state A to the state C along the first engine operating line L1, as indicated by arrow-headed broken line in FIG. 11, while at the same time the motor/generator 16 is operated as an electric generator to charge the battery 42 with the calculated charging amount Pchg of electric energy. To control the motor/generator 16 as an electric generator for transition from the state A to the state C, the desired torque Tdrv of the engine 16 required to provide the desired drive power Pdrv is obtained from the speed ratio γ of the transmission 12 from time to time, and the motor/generator 16 is controlled so as to generate a regenerative torque which is equal to a difference (Te−Tdrv) between the presently detected engine torque Te and the desired engine torque Tdrv.

If the energy conversion efficiency θ chg calculated in step S5 is lower than the predetermined threshold, a negative decision (NO) is obtained in step S6, and the control flow goes to step S8 to inhibit the charging of the battery 42. As a result, the charging of the battery 42 is terminated, and the engine operating state is restored from the state C back to the state A in which the engine 14 is operated to provide the desired drive power Pdrv.

In the present embodiment, the battery 42 is charged by operation of the motor/generator 16 only when the energy conversion efficiency of the motor/generator 16 is not lower than the predetermined threshold. Thus, the charging of the battery 42 is restricted depending upon the energy conversion efficiency η chg of the motor/generator 16, and the fuel economy of the engine 14 is accordingly improved. As a result of this restricted charging of the battery 42, the battery 42 is charged at a comparatively high speed Ne of the engine 14, and the charging does not take place when the accelerator pedal 78 is released. If the battery charging took place upon releasing of the accelerator pedal 78, the engine speed Ne would be undesirably raised. Thus, the present arrangement prevents a rise of the engine speed Ne due to the battery charging upon releasing of the accelerator pedal 78, and is effective to reduce a change of the engine speed Ne due to the battery charging. Such rise and change of the engine speed Ne are unexpected to the vehicle operator.

It will be understood that a portion of the DIRECT-MODE control means 102 of the hybrid control device 60 assigned to implement steps S6–S8 functions as a charging opportunity selecting device operable to determine, on the basis of the energy conversion efficiency of the motor/generator 16, whether the battery 42 should be charged by operation of the motor/generator 16.

In the present embodiment wherein the required charging amount Pchg of the battery 42 is determined within a range larger than the predetermined lower limit α, it is not necessary to determine whether the required charging amount Pchg is larger or smaller than the lower limit, for determining whether the charging of the battery 42 is permitted or inhibited. However, if the required charging amount Pchg is linearly increased from zero with a decrease of the stored electric energy amount SOC, as indicated by broken line in FIG. 8, the determination as to whether the battery 42 can be charged may be made by determining whether the charging amount Pchg is larger than the lower limit α.

Referring to the flow chart of FIG. 10, there is illustrated a control routine also executed by the DIRECT-MODE control means 102. Steps R1–R4 of this control routine are identical with steps S1-S4 of the control routine of FIG. 7. Step R4 is followed by step R5 to determine whether the desired engine speed Ne* is higher than the presently detected engine speed Ne. When the desired engine speed Ne* becomes higher than the detected engine speed Ne as a result of an increase in the desired engine speed Ne* due to an increase in the operating amount of the accelerator pedal 78, for instance, an affirmative decision (YES) is obtained in step R6.

Step R6 is provided o command the transmission control device 68 for shifting down the continuously variable transmission 12 so that the actual engine speed Ne coincides with the desired value Ne*. Step R6 is followed by step R7 to determine whether this shift-down action of the continuously variable transmission 12 is required in order to charge the battery 42. This determination in step R7 may be effected depending upon the required charging amount Pchg of the battery 42, for example. Any suitable parameter other than the required charging amount Pchg may be used to determine whether the battery 42 should be charged. For instance, the energy conversion efficiency of the motor/generator 16 may be used as in the first embodiment. If the affirmative decision (YES) is obtained in step R7, the control flow goes to step R9 in which the transmission 12 is shifted down at a lower speed than usual, and the output of the engine 14 is increased at a normal rate by increasing the opening angle of the electronic throttle valve 72. Described more specifically by reference to FIG. 11, the transmission 12 is shifted down and the output of the engine 14 is increased under the control of the engine-output increasing means 90, so that the operating state of the engine 14 is changed from the state A to the state C along the first engine operating line L1, as indicated in FIG. 11. The shift-down speed of the transmission 12 can be reduced by smoothing the desired value of its input shaft speed Nin, or by gradually changing the charging amount Pchg at a rate lower than a predetermined upper limit.

Described more specifically by reference to FIG. 11, the transmission 12 is shifted down and the output of the engine 14 is increased-under the control of the engine-output increasing means 90, so that the operating state of the engine 14 is changed from the state A to the state C along the first engine operating line L1, as indicated in FIG. 11. The shift-down speed of the transmission 14 can be reduced by smoothing the desired value of its input shaft speed Nin, or by gradually changing the charging amount Pchg at a rate lower than a predetermined upper limit.

In step R9, the operation of the motor/generator 16 as an electric generator is initiated. To control the motor/generator 16 as an electric generator for transition from the state A to the state C, as indicated by broken line in FIG. 11, the desired torque Tdrv of the engine 14 required to provide the is desired drive power Pdrv is obtained from the speed ratio y of the transmission 12 from time to time, and the motor/generator 16 is controlled so as to generate a regenerative torque which is equal to a difference (Te−Tdrv) between the presently detected engine torque Te and the desired engine torque Tdrv, as in the first embodiment of FIG. 7 described above with respect to step S7. According to this arrangement, the vehicle can be driven with the drive force according to the operator's desired drive power Pdrv, even while the transmission 12 is in the process of the shift-down action. After the engine 14 has been placed in the operating state C, the regenerative torque Tm of the motor/generator 16 is controlled according to the speed Nm so that the electric energy amount generated by the motor/generator 16 corresponds to the charging amount Pchg of the battery 42.

If a negative decision (NO) is obtained in step R7, that is, the shifting of the transmission 12 is required for a purpose other than the charging of the battery 42, the control flow goes to step R8 to determine whether the shifting of the transmission 12 is required by an increase of the operator's desired drive power Pdrv. For example, this determination in step R8 is effected by determining whether the operating amount θac of the accelerator pedal 78 or a rate of increase Δηac is larger or higher than a predetermined threshold, or whether a rate of increase of the operator's desired drive power Pdrv is higher than a predetermined threshold. If an affirmative decision (YES) is obtained in step R8, the control flow goes to step R10 in which the transmission 12 is shifted down at the normal rate and the output of the engine 10 is increased at a comparatively high rate by the engine-output increasing means 90. Described more specifically by reference to FIG. 11, the torque Te of the engine 14 is rapidly increased from the point representing the present operating state A of the engine 14 on the first engine operating line L1, to a point on a second engine operating line L2 on which the engine torque Te is higher than that on the first engine operating line L1, and the transmission 12 is rapidly shifted down so that the engine 14 is brought to the operating state B represented by a point of intersection between the second engine operating line L2 and an iso-power line W2 which represents the required total vehicle drive power Ptotal (which is now equal to the operator's desired drive power Pdrv). In view of an expected control response delay of the shift-down action of the transmission 12, the engine torque Te is first increased by the engine-output increasing means 0, and as a result of this increase of the engine torque Te, the engine speed Ne is increased substantially following the second engine operating line L2 while the shift-down action of the transmission 12 is controlled. The engine torque Te represented by the second engine operating line L2 is larger by a given amount than that represented by the first engine operating line L1. This difference between the engine torque values represented by first and second engine operating lines L1, L2 may be either a fixed constant value, or a variable which changes with the operator's desired drive power Pdrv or a rate of increase thereof, for instance. Although the point representing the operating state B as shown in FIG. 11 lies on the same iso-power line W2 s the point representing the operating state C, in the interest of simplification of the graph, the points representing these operating states B and C may be suitably located depending upon the required total drive power Ptotal.

In step R10, the motor/generator 16 may be controlled so as to provide an assisting drive torque for assisting the engine 14 in driving the vehicle in the DIRECT mode. Step R10 is further formulated to restore the operating mode of the engine-output increasing means 9 to the normal mode described above with respect to step R9, and restore the operating state of the engine 14 to a state represented by a point on the first engine operating line L1 for improved fuel economy or reduced fuel consumption of the engine 14, when the operator's desire to accelerate the vehicle becomes absent. For instance, the absence of the operator's desire to accelerate the vehicle can be detected when the operating amount ηac of the accelerator pedal 78 has been reduced or when a predetermined time has passed after the operator's desire to accelerate the vehicle was detected.

If a negative decision (NO) is obtained in step R8, that is, if the shift-down action of the transmission 12 is required due to a slight amount of increase of the operating amount θac of the accelerator pedal 78, the control flow goes to step R11 in which the transmission 12 is shifted down at the normal speed, and the output of the engine 14 is increased at the normal rate by increasing the opening angle of the electronic throttle valve 72. As a result, the point representing the operating state of the engine 14 is slightly moved from the point representing the state A, along the first engine operating line L1, toward a point on the isopower line W2.

If a negative decision (NO) is obtained in step R5, that is, if the desired engine speed value Ne* has been reduced to the actual engine speed value or lower due to the absence of the operator's desire to accelerate the vehicle or the completion of charging of the battery 42, the control flow goes to step R12 in which the hybrid control device 60 commands the transmission control device 68 to shift up the transmission 12 so that the actual engine speed value Ne becomes equal to the desired value Ne*. Further, the output of the engine 14 is reduced in step R12, by closing the electronic throttle valve 72, for instance.

Thus, the present embodiment is arranged to charge the battery 42 such that the engine output is increased while the engine speed Ne is increased along the first engine operating line L1 for improved fuel economy, with a shift-down action of the transmission 12. Accordingly, the battery 42 can be charged with a high degree of fuel economy of the engine 14 without reducing the vehicle drive force.

The present embodiment is further arranged such that speed at which the transmission 12 is shifted down when the battery 42 is charged is lower than that when the transmission 12 is normally shifted. This arrangement reduces a variation in the vehicle drive force due to an inertia of the engine 14,which would take place if the engine speed Ne were raised upon a shift-down action of the transmission 12. Further, the point representing the operating state of the engine 14 is moved following the first engine operating line L1 with a high degree of accuracy, so that the fuel economy of the engine 14 is further improved.

When the operator's desired drive power Pdrv is increased, the torque Te of the engine 14 is rapidly increased by the engine-output increasing means 90, and the transmission 12 is shifted down to increase the engine speed Ne along the second engine operating line L2 which is formulated for powerful driving of the vehicle. Accordingly, the vehicle drive torque can be rapidly increased so that the vehicle can be driven with a sufficient drive power.

It will be understood that a portion of the DIRECT-MODE control means 10 of the hybrid control device 60 assigned to implement step R7 functions as a charging opportunity selecting device operable to determine, on the basis of the required charging amount Pchg of the battery 42, whether the battery 42 should be charged by operation of the motor/generator 16. It will also be understood that a portion of the DIRECT-MODE control means 102 assigned to implement step R9 of FIG. 10 functions as a first engine/transmission control device operable upon charging of the battery 42, to increase the engine torque Te while shifting down the transmission 12 so as to increase the engine speed Ne, and that a portion of the control means 102 assigned to implement step R10 functions as a second engine/transmission control device operable upon an increase in the operator's desired drive power Pdrv, to increase engine torque Te and shifting down the transmission 12 so as to increase the engine speed Ne.

While the presently preferred embodiments of this invention have been described above in detail by reference to the accompanying drawings, for illustrative purpose only, it is to be understood that the present invention may be embodied with various changes, modifications and improvements, which may occur to those skilled in the art, without departing from the spirit and scope of the invention defined in the following claims.

What is claimed is:

1. A control apparatus to control a hybrid automotive vehicle including an engine operable by combustion of a fuel and an electric motor as drive power sources for driving the vehicle, and an electric generator operable by said engine to generate an electric energy for charging a battery while the vehicle is driven by said engine, said control apparatus comprising:

a charging opportunity selecting device operable to determine whether said battery should be charged by said electric generator, on the basis of at least an energy conversion efficiency of said electric generator.

2. A control apparatus according to claim 1, further comprising means for determining a required charging amount of electric with which said battery is charged, on the basis of an amount of electric energy stored in said battery, and wherein said charging opportunity selecting means determines said energy efficiency of said electric motor on the basis of the determined required charging amount.

3. A control apparatus according to claim 1, wherein said electric motor and said electric generator are combined into a motor/generator which selectively functions as said electric motor or said electric generator, and said hybrid automotive vehicle includes an output member operatively connected to a drive wheel of the vehicle for driving the vehicle, a synthesizing/distributing device of gear type connected to said engine, said motor/generator and said output member, for synthesizing and distributing forces among said engine, said motor/generator and said output member, and a continuously variable transmission disposed between said output member and said drive wheel.

4. A control apparatus according to claim 3, wherein said synthesizing/distributing device includes a housing, a first rotary element connected to said engine, a second rotary element connected to said motor/generator and connected to said output member through a first clutch, and a third rotary element connected to said output member through a second clutch and fixed to said housing through a brake.

5. A control apparatus according to claim 1, further comprising:

means for calculating a desired vehicle drive power by which the vehicle is driven by said engine;

means for calculating required charging amount of electric energy with which said battery is charged during an operation of said engine to drive the vehicle; and means for calculating a desired operating speed of said engine on the basis of the calculated desired vehicle drive power and the calculated required charging amount, wherein said charging opportunity selecting device determines said energy conversion efficiency of said electric generator on the basis of the calculated desired operating speed of said engine and said calculated required charging amount of electric energy of said battery.

6. A control apparatus for controlling a hybrid automotive vehicle including an engine operable by combustion of a fuel and an electric motor as drive power sources for driving the vehicle, a continuously variable transmission through which at least a drive force generated by said engine is transmitted to drive wheels of the vehicle, and an electric generator operable by said engine to generate an electric energy for charging a battery while the vehicle is driven by said engine, said control apparatus comprising:

a first engine/transmission control device operable upon charging of said battery, to increase a torque of said engine while shifting down said continuously variable transmission so as to increase an operating speed of said engine; and a second engine/transmission control device operable upon an increase in a vehicle-operator's desired drive power for driving the vehicle, to increase said torque of said engine and shifting down said transmission so as to increase the operating speed of said engine, said second engine/transmission control device including engine-output increasing means for increasing said torque of said engine, said engine having a throttle valve, and said engine-output increasing means having a response higher than said throttle valve.

7. A control apparatus according to claim 6, wherein said first engine/transmission control device controls said engine such that an operating state of said engine changes along a first engine operating line which is formulated for improved fuel economy of said engine, and said second engine/transmission control device controls said engine such that the operating state of said engine changes along a second engine operating line which is formulated to provide a larger torque than said first engine operating line, said first and second engine operating lines being defined by the torque and speed of said engine.

8. A control apparatus according to claim 6, wherein said first engine/transmission control device shifts down said continuously variable transmission at a speed which is lower than that at which said continuously variable transmission is shifted down while said battery is not charged.

9. A control apparatus according to claim 6, wherein said hybrid automotive vehicle includes a motor/generator which selectively functions as said electric motor and said electric generator, an output member operatively connected through said continuously variable transmission to a drive wheel of the vehicle for driving the vehicle, and a synthesizing/distributing device of gear type connected to said engine, said motor/generator and said output member, for synthesizing and distributing forces among said engine, said motor/generator and said output member.

10. A control apparatus according to claim 6, wherein said synthesizing/distributing device includes a housing, a first rotary element connected to said engine, a second rotary element connected to said motor/generator and connected to said output member through a first clutch, and a third rotary element connected to said output member through a second clutch and fixed to said housing through a brake.

11. A control apparatus according to claim 10 further comprising means for determining said energy conversion efficiency of said electric generator on the basis of an amount of electric power to be generated by said electric generator to charge said battery.

\* \* \* \* \*

UNITED STATES PATENT AND TRADEMARK OFFICE
CERTIFICATE OF CORRECTION

PATENT NO.    : 6,637,530 B1
DATED         : October 28, 2003
INVENTOR(S)   : Hiroatsu Endo et al.

It is certified that error appears in the above-identified patent and that said Letters Patent is hereby corrected as shown below:

Column 4,
Line 37, change "D4 xlean-burn" to -- D4 lean-burn --.

Column 10,
Line 39, change "step S I in" to -- step S1 in --.

Column 11,
Line 6, change "pchg" to -- $\eta$chg. --.
Line 16, change "limit a" to -- limit $\alpha$ --.
Line 65, change "77 chg" to -- $\eta$chg --.

Column 12,
Line 20, change "$\theta$ chg" to -- $\eta$chg --.

Column 14,
Line 7, change "$\Delta\eta$ac" to -- $\Delta\theta$ac --.
Line 58, change "amount $\eta$ac" to -- amount $\theta$ac --.

Column 16,
Line 2, change "to control" to -- for controlling --.
Line 8, after "comprising:" start new paragraph and insert:
-- a charging amount determining device operable to determine a required charging amount of electric energy with which said battery is charged, on the basis of an amount of electric energy stored in said battery; and --
Line 12, after "generator" insert -- and the determined required amount of electric energy --.
Line 39, after "claim 1," insert -- wherein said charging amount determining device calculates said required charging amount of electric energy of said battery during an operation of said engine to drive the vehicle, said control apparatus --
Line 42, delete "means for calculating" and insert -- a drive power calculating device operable to calculate --
Lines 44-45, delete entirely.
Line 46, delete starting with "operation" and ending with "vehicle;"

UNITED STATES PATENT AND TRADEMARK OFFICE
CERTIFICATE OF CORRECTION

PATENT NO. : 6,637,530 B1
DATED : October 28, 2003
INVENTOR(S) : Hiroatsu Endo et al.

It is certified that error appears in the above-identified patent and that said Letters Patent is hereby corrected as shown below:

Column 16 (cont'd),
Line 47, delete "means for calculating" and insert -- a speed calculating device operable to calculate --.

Signed and Sealed this

Twenty-fourth Day of August, 2004

JON W. DUDAS
*Director of the United States Patent and Trademark Office*